US007174345B2

(12) United States Patent
Malaney et al.

(10) Patent No.: US 7,174,345 B2
(45) Date of Patent: Feb. 6, 2007

(54) METHODS AND SYSTEMS FOR AUTO-PARTITIONING OF SCHEMA OBJECTS

(75) Inventors: Kevin Malaney, San Francisco, CA (US); Matthew Jakubiak, San Mateo, CA (US); Roger Bolsius, Pleasanton, CA (US)

(73) Assignee: Oracle International Corporation, Redwood Shores, CA (US)

( * ) Notice: Subject to any disclaimer, the term of this patent is extended or adjusted under 35 U.S.C. 154(b) by 497 days.

(21) Appl. No.: 10/452,408

(22) Filed: May 30, 2003

(65) Prior Publication Data

US 2004/0243618 A1    Dec. 2, 2004

(51) Int. Cl.
*G06F 17/30* (2006.01)
(52) U.S. Cl. .................... 707/102; 707/101; 707/203
(58) Field of Classification Search ........ 707/101–102, 707/203; 709/215; 715/511; 714/42
See application file for complete search history.

(56) References Cited

U.S. PATENT DOCUMENTS

| 4,575,827 | A | * | 3/1986 | Kulakowski | ........... 365/230.01 |
|---|---|---|---|---|---|
| 5,388,255 | A | * | 2/1995 | Pytlik et al. | ................... 707/4 |
| 6,105,033 | A | * | 8/2000 | Levine | ........................ 707/101 |
| 6,182,121 | B1 | * | 1/2001 | Wlaschin | .................... 709/215 |
| 6,321,235 | B1 | * | 11/2001 | Bird | ........................... 707/203 |
| 2002/0123978 | A1 | * | 9/2002 | Bird et al. | ...................... 707/1 |
| 2002/0184570 | A1 | * | 12/2002 | Etgen | .......................... 714/42 |
| 2005/0108626 | A1 | * | 5/2005 | Ong | ........................... 715/511 |

OTHER PUBLICATIONS

Oracle White Paper, "Oracle9iAS Clickstream Intelligence" Aug. 2002 (37pgs).

\* cited by examiner

*Primary Examiner*—Tim Vo
*Assistant Examiner*—Olubusola Oni
(74) *Attorney, Agent, or Firm*—Young Law Firm, P.C.

(57) ABSTRACT

A method of partitioning a schema object containing Web server log file data that includes a plurality of dated entries. Existing partitions within the schema object are identified, as well as the date associated with each existing partition. Unique dates of the entries within the log file data are also identified. A separate partition within the schema object is then automatically created for a) each identified unique date of the entries within the log file data that is not associated with an identified existing partition, and for b) each date immediately preceding each date in a) unless the partition has previously been created. This method avoids splitting loaded partitions when the Web server log file data is loaded out of turn.

27 Claims, 6 Drawing Sheets

| Field | Example Value | Explanation |
|---|---|---|
| Host | 148.87.9.44 | The domain name or IP-address of the client. |
| Ident | - | The login name of the user as supplied by the ident demon, if running on the client. |
| Authuser | - | The user name that was supplied, if the document was password-protected. |
| Time | [21/May/2002:17:52:29 -0800] | The time the request reached the server. |
| Request | GET /admin/images/logo.gif HTTP/1.1 | The first line of the HTTP request from the client. |
| Status | 200 | The status code returned to the client (200 means OK). |
| Bytes | 881 | The number of bytes transferred to the client. |
| Referrer | http://otn.oracle.com/ | The page that the user was last viewing. |
| User-agent | Mozilla/4.0 (compatible; MSIE 6.0; Windows NT 5.0) | The browser type. |

FIG. 2

{D} = March 14, March 15

{D-1} = March 13, March 14

{D} U {D-1} = {P} = March 13, March 14, March 15

P = March 15

PM = MAXVALUE

METHODS AND SYSTEMS FOR AUTO-PARTITIONING OF SCHEMA OBJECTS

BACKGROUND OF THE INVENTION

1. Field of the Invention

The present invention relates to the field of databases. In particular, the present invention relates to methods and systems for automatically partitioning schema objects, such as large database tables.

2. Description of the Related Art

The concepts of launching a Web browser, pointing it at a Web site of interest, and viewing the site's content by clicking on the links that are presented on each page are now familiar concepts. A Web page may appear to be a monolithic logical unit when it is viewed, yet it really can be further decomposed. For example, a typical Web page may include some HTML text and multiple images. Other pages may contain running applets that provide streaming audio or video. At other times, the user is not viewing a page in the ordinary sense at all, but may be interacting instead with an application that is running on a server somewhere. The Web server that provides such content may not have the logical concept of a page. From the Web server's point of view, it is merely responding to requests from browsers that connect to it, including requests for HTML text, images, Java Server Pages (JSP) and the like. Web servers usually maintain logs of all such received requests. These log files, therefore, constitute an audit trail that provides detailed information about the activities on a site. This trail is sometimes referred to as the "clickstream" of the site. Every time someone views a page from a Web site, the Web server writes one or more entries in the log file. Moreover, every page view recorded in a Web server log file corresponds to one entry therein. The entries in the log file may include attributes such as, for example, measures such as the byte count, dwell time, time to serve, and dimension table foreign keys. The data in the log file usually adheres to one of the standard log file formats unless the format has been customized. Most Web servers support at least one of three open log file formats: NCSA Common Log File Format (CLF), NCSA Extended Log File Format (ECLF), or W3C Extended Log File Format (ExLF).

Because even simple pages typically require multiple requests before they can be fully rendered, Web server log files can quickly grow very large. For example, a small site with only a few hundred page views a day can easily generate log files with thousands of entries on a daily basis. A large and popular site may generate a log file in which millions of additional entries are added every day. In the early days of the Web, when there was not much activity, it might have been possible for an administrator to manually inspect the log files and gain some rough understanding of the magnitude and nature of the traffic on a Web site. The sheer size and complexity of the log files in use today preclude such an approach. Today's log file volumes require automated methods of turning the raw log file data into useful business information.

Whatever the format, the Web server log file may be used as the raw data to generate various reports related to the Web site's effectiveness, traffic patterns and other usage and performance metrics. Conventional Web analytic applications may have a set of predetermined report engines that query the Web server log file and build a report based upon the results of the queries. However, as such conventional tools do not persistently store the Web log raw data, they do not have the ability to execute ad-hoc and dynamic queries of the log file data. Such queries must be formulated within the context of a new report, which will then go back to the Web server log file to execute the queries necessary to build the requested report.

As noted above, the log file may grow by potentially millions of new entries each day. To facilitate queries on such large data sets, the log file data may be loaded into a database table or tables. However, queries on such large tables tend to perform poorly, as the query may have to traverse a potentially large number of rows to access the needed data. Partitioning is often used to logically break such large tables into more manageable units. Typically, all partitions of a given table will have the same structure and each partition will contain a subset of the range of total rows of the table. A convenient way to partition Web log files, for example, is by day. That is, all records created in a given day or a predetermined range of days will be assigned to a predetermined partition. Partitioning is now a standard feature of most databases. Conventionally, the burden of setting up and maintaining partitions falls upon technically trained persons such as the database administrator (DBA). Often, a database schema contains many large tables, each of which must be partitioned to optimize queries thereon. Partitioning can, therefore, become a substantial administrative burden.

It is clear, therefore, that a need exists for automating the partitioning process and making such partitioning process accessible to non-technically trained persons. Such an accessible and automated portioning method would find utility not only within the context of managing and using Web server log files but in many other instances in which very large database tables are created.

SUMMARY OF THE INVENTION

A method of partitioning a schema object comprising a plurality of rows, each row including a date, according to an embodiment of the present invention, may include steps of generating a list of dates associated with the plurality of rows; determining whether a partition exists for each unique date in the generated list of dates; determining whether a partition exists for each date that immediately precedes each unique date in the generated list of dates; carrying out a first creating step to create a partition for each date in the generated list of dates for which a partition does not yet exist, and carrying out a second creating step to create a partition for each date that immediately precedes each date in the generated list for which a partition does not yet exist.

For each date in the generated list, the second partition-creating step is carried out before any data is stored in the partition created in the first partition-creating step. The second partition-creating step is carried out before any data is stored in the partition created in the second partition-creating step. The first and second partition creating steps may be created with selectable parameters. The selectable parameters may include a tablespace to which the created partition may be to belong. The generating step may include a step of reading a Web server log file. The first and second creating steps may include formulating and executing a partition-creating command. The partition-creating command may include a Data Definition Language (DDL) Structured Query Language (SQL) command.

According to another embodiment thereof, the present invention is also a machine-readable medium having data stored thereon representing sequences of instructions which, when executed by computing device, causes said computing device to partition a schema object comprising a plurality of rows, each row including a date, by performing the steps of: generating a list of dates associated with the plurality of rows; determining whether a partition exists for each unique date in the generated list of dates; determining whether a partition exists for each date that immediately precedes each unique date in the generated list of dates; carrying out a first creating step to create a partition for each date in the generated list of dates for which a partition does not yet exist, and carrying out a second creating step to create a partition for each date that immediately precedes each date in the generated list for which a partition does not yet exist.

For each date in the generated list, the second partition-creating step is carried out before any data is stored in the partition created in the first partition-creating step. The second partition-creating step is carried out before any data is stored in the partition created in the second partition-creating step. The first and second partition creating steps may be created with selectable parameters. The selectable parameters may include a tablespace to which the created partition may be to belong. The generating step may include a step of reading a Web server log file. The first and second creating steps may include formulating and executing a partition-creating command. The partition-creating command may include a Data Definition Language (DDL) Structured Query Language (SQL) command.

The present invention is also a computer system suitable for partitioning a schema object comprising a plurality of rows, each row including a date, comprising: at least one processor; at least one data storage device; a plurality of processes spawned by said at least one processor, the processes including processing logic for: generating a list of dates associated with the plurality of rows; determining whether a partition exists for each unique date in the generated list of dates; determining whether a partition exists for each date that immediately precedes each unique date in the generated list of dates; carrying out a first creating step to create a partition for each date in the generated list of dates for which a partition does not yet exist, and carrying out a second creating step to create a partition for each date that immediately precedes each date in the generated list for which a partition does not yet exist.

According to another embodiment thereof, the present invention is a method of partitioning a database table comprising a plurality of rows, each row being associated with a date, comprising the steps of: generating a first list of dates, the first list of dates containing dates associated with the plurality of rows; generating a second list of dates from the first list, the second list containing only dates that immediately precede each date in the first list; generating a third list of dates from the first and second lists of dates, the third list containing each unique date that appears on the first list or on the second list and that does not have an existing partition within the database table associated therewith; for each date in the third list, sequentially carrying out the steps of: identifying a partition in the table associated with an earliest date that is after the current date in the third list, and splitting the identified partition at a boundary defined by the date in the third list to create a new partition associated with the date in the third list.

The first list generating step may include a step of reading a Web server log file, and the first list of dates may be generated from data in the log file. The method may further include loading Web server log file data into at least one of the created new partitions. The splitting step may create a new partition for which the Web server log file has no Web server log file data.

According to another embodiment thereof, the present invention is a machine-readable medium having data stored thereon representing sequences of instructions which, when executed by computing device, causes said computing device to partition a database table comprising a plurality of rows, each row being associated with a date, by performing the steps of: generating a first list of dates, the first list of dates containing dates associated with the plurality of rows; generating a second list of dates from the first list, the second list containing only dates that immediately precede each date in the first list; generating a third list of dates from the first and second lists of dates, the third list containing each unique date that appears on the first list or on the second list and that does not have an existing partition within the database table associated therewith; for each date in the third list, sequentially carrying out the steps of: identifying a partition in the table associated with an earliest date that is after the current date in the third list, and splitting the identified partition at a boundary defined by the date in the third list to create a new partition associated with the date in the third list.

The first list generating step may include a step of reading a Web server log file, the first list of dates may be generated from data in the log file. The method may further include loading Web server log file data into at least one of the created new partitions. The splitting step may create a new partition for which the Web server log file has no Web server log file data.

The present invention is also a computer system suitable for partitioning a database table comprising a plurality of rows, each row being associated with a date, the computer system comprising: at least one processor; at least one data storage device; a plurality of processes spawned by said at least one processor, the processes including processing logic for: generating a first list of dates, the first list of dates containing dates associated with the plurality of rows; generating a second list of dates from the first list, the second list containing only dates that immediately precede each date in the first list; generating a third list of dates from the first and second lists of dates, the third list containing each unique date that appears on the first list or on the second list and that does not have an existing partition within the database table associated therewith; for each date in the third list, sequentially carrying out the steps of: identifying a partition in the table associated with an earliest date that is after the current date in the third list, and splitting the identified partition at a boundary defined by the date in the third list to create a new partition associated with the date in the third list.

According to still another embodiment thereof, the present invention is a method of partitioning a schema object containing Web server log file data, the log file data including a plurality of dated entries, comprising: identifying existing partitions within the schema object, a date being associated with each existing partition; identifying unique dates of the entries within the log file data; creating a separate partition within the schema object for: a) each identified unique date of the entries within the log file data that may be not associated with an identified existing partition, and b) each date immediately preceding each date in a) unless previously created.

BRIEF DESCRIPTION OF THE DRAWINGS

For a further understanding of the objects and advantages of the present invention reference should be made to the following detailed description, taken in conjunction with the accompanying figures, in which:

FIG. 1 shows a system according to an embodiment of the present invention.

FIG. 2 shows a table that describes exemplary fields in a Web server log file.

DESCRIPTION OF THE PREFERRED EMBODIMENTS

Definitions

Figure 1:
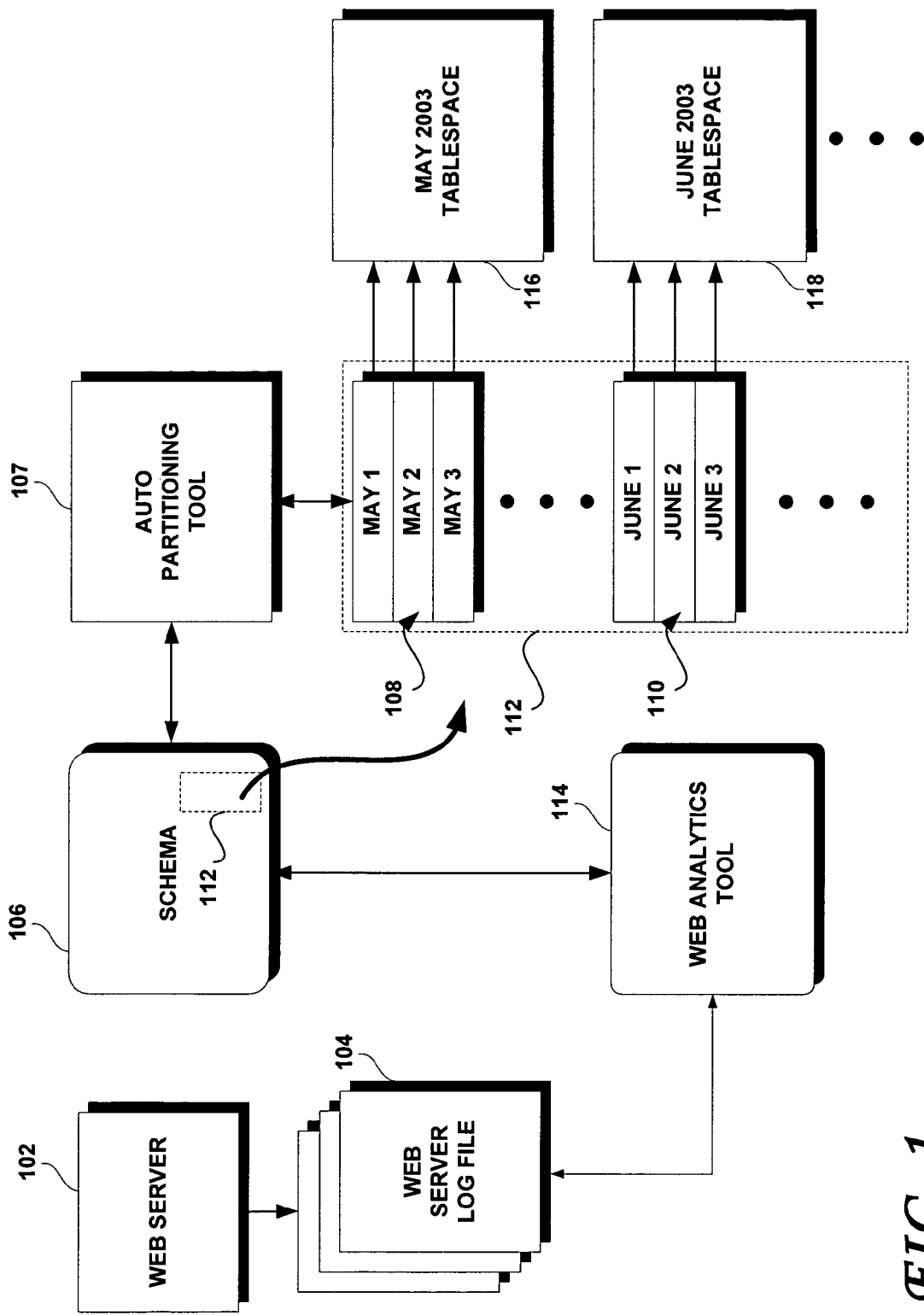

Database: A collection of data treated as a unit. The general purpose of a database is to store and retrieve related information. A database has logical structures and physical structures.

Tablespace: A database may be divided into storage units called tablespaces. A tablespace is used to group data structures together.

Schema: A schema is a collection of objects. A schema may be associated with each database user. Schema objects are the logical structures that directly refer to the database's data. Schema objects include such structures as tables, views, sequences, stored procedures, synonyms, indexes, clusters and database links. There is no relationship between a tablespace and a schema; objects in the same schema can be in different tablespaces and a tablespace can hold objects from different schemas.

Datafile: A datafile is a physical database structure that contains the database data. The data of logical database structures such as tables and indexes is physically stored in the datafiles allocated for a database. A datafile can be associated with only one database and one or more datafiles may form a tablespace.

Table: A table is a collection of rows having the same structure.

Partitioning: Partitioning addresses the key problem of supporting large tables and indexes by allowing users to decompose them into smaller and more manageable pieces called partitions. Partitioning improves many performance characteristics, including the loading, querying and maintaining of large database tables. Range partitioning maps rows of a table to partitions based on ranges of column values.

Partition Bounds: Every table and index may define a non-inclusive upper bound. Every partition except the first partition may have a lower bound.

SQL: Structured Query Language. Pronounced "sequel". SQL is a cross platform language used to select, update, insert, or delete data in relational databases. SQL is also used to administer the RDBMS (relational database management system).

DDL: (Data Definition Language). These SQL statements define the structure of a database, including rows, columns, tables, indexes, and database specifics such as file locations.

Index: Structures associated with tables that speed retrieval of rows.

Functional Overview

Partitioning can provide tremendous benefits to a wide variety of applications by improving manageability, performance, and availability. It is not unusual for partitioning to improve the performance of certain queries or maintenance operations by an order of magnitude. Moreover, partitioning can greatly simplify common administration tasks. Partitioning also enables database designers and administrators to tackle some of the toughest problems posed by cutting-edge applications. Partitioning is a key tool for building multi-terabyte systems or systems with extremely high availability requirements. Partitioning allows a table, index or index-organized table to be subdivided into smaller pieces. Each piece of database object is called a partition. Each partition has its own name, and may optionally have its own storage characteristics, such as having table compression enabled or being stored in different tablespaces. From the perspective of a database administrator, a partitioned object has multiple pieces, which can be managed either collectively or individually. This gives the administrator considerably flexibility in managing partitioned objects. However, from the perspective of the application, a partitioned table is identical to a non-partitioned table; no modifications are necessary when accessing a partitioned table using SQL commands. Tables may be partitioned using a 'partitioning key', a set of columns that determine in which partition a given row will reside. One partitioning technique is range partitioning, in which each partition may be specified by a range of values of the partitioning key (for a table with a date column as the partitioning key, the 'January-2001' partition contains rows with the partitioning-key values from '01-JAN-2001'–'31-JAN-2001').

FIG. 1 shows a system according to an embodiment of the present invention. As shown, a Web server 102 responds to HTTP requests and writes to one or more Web server log files 104 in the process to record aspects of this activity. FIG. 2 shows a number of exemplary fields in such Web server log files 104. Schema objects may then be created within the schema 106. Examples of such schema objects include, for example, tables and indices. A Web analytics tool 114 such as, for example, Oracle Corporation's Clickstream Intelligence® may be used to analyze and to load the log file data into the schema object(s) within the schema 106. An auto partitioning tool 107 implementing embodiments of the present invention may access the schema objects (such as the tables containing the Web server log file data), determine whether partitioning is needed and partition the schema object as needed. After the necessary partition(s) are created, the log file data may be appropriately loaded into the partitioned schema object. Partitioning improves query and loading performance as well as other database operations such as index rebuilding and analyzing, operations that are heavily dependent upon the number of rows in the table. The present auto-partitioning tool 107 enables non-technical persons to efficiently partition large schema objects such as tables. Such partitions are advantageously created by the auto-Partitioning tool 107 based on the dates of the entries in the Web server log file data loaded into the schema objects within the schema 106. Briefly, the auto-partitioning tool 107 according to embodiments of the present invention may determine the distinct dates of the data entries within the data loaded into the schema objects of schema 106. Thereafter, the auto-partitioning tool may check existing partitions (if any) in the schema object(s) and ensure that partitions for each day (or each selected range of dates) exist. If partitions are missing, the present auto-partitioning tool 107 creates the missing partitions, as described in greater detail below. According to embodiments of the present invention, partitions are not only created for each distinct date or selected range of dates for which there is log file data. Indeed, partitions may also be created for selected dates for which no log file data exists, as detailed below.

The auto-partitioning tool 107 may be constrained by selectable parameters, including the range of dates (e.g., one partition for each day, or one partition for a selectable range of dates), as well as which tablespace to use for each created partition. For example, FIG. 1 shows a table 112 for which partitions have been created, each partition being associated with a date. As shown, the table 112 has been partitioned such that all records having the same date are grouped within the same partition. That is, entries containing Web server log file data dated May 1 are stored in a partition, and entries containing Log file data dated May 2 are stored in another partition, and so on. All May partitions may be associated with the May 2003 tablespace 116. Likewise, all June partitions may be associated with the June 2003 tablespace. It is good practice to create tablespaces for each month. This enables the tablespace for any particular month to be taken offline without affecting the tablespaces for other months, for example. As shown, multiple partitions may be assigned to a single tablespace. Separate tablespaces may be created for indexes.

FIG. 2 shows a table that describes the meaning of exemplary fields in a Web server log file. As shown therein, a Web server log file may include a host field, which identifies the domain name or IP-address of the computer accessing the Web site. Other fields may include the date and time at which the HTTP request reached the Web server, an identification of the page the user was viewing and the browser type. The Web server log may include many other fields, some of which are shown in FIG. 2. Each time a user accesses the Web server and makes an HTTP request, an entry may be created in the Web server log file. Understandably, popular Web sites may receive millions of such HTTP requests every day. According to an embodiment of the present invention, the raw data from the Web server log file may be loaded into a database schema in the form of database tables, for example. As the raw data is stored in a database schema, the entire Web server log file may be freely queried using any standard SQL tool, for example. To optimize the query performance, the table or tables that contain the Web server log data and that are loaded into the schema may be partitioned. Such partitioning may not only increase the query performance, but may also reduce the time required to rebuild indices, among other benefits. To optimize query performance, embodiments of the present invention envisage automatically partitioning the tables of the schema.

According to an embodiment of the present invention, a separate partition may be created at least for each day—or for at least each day for which log file data exists. However, other embodiments of the present invention may also create partitions covering a range of dates or several partitions for each day (e.g., a partition every eight hours). The created partitions of a schema object partitioned according to an embodiment of the present invention may be associated with a predetermined tablespace. A single table may include partitions that are associated with a single tablespace or a plurality of tablespaces. A separate tablespace may be created each month for the indices also, and embodiments of the present invention may be used to partition indices. Herein, the indices and tables containing the Web server log file raw data are collectively referenced as "partitioned objects".

Figure 3:
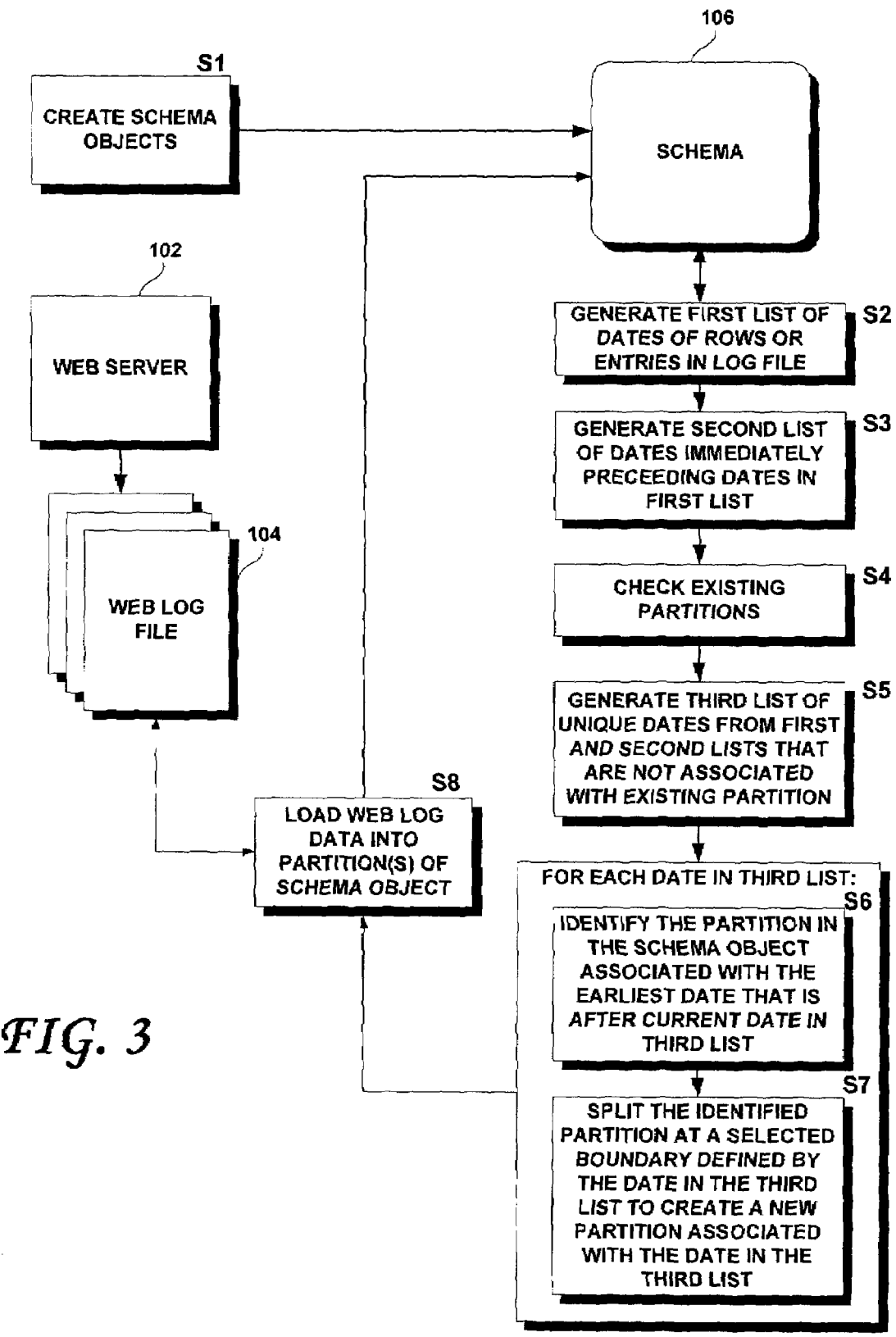
FIG. 3 is a flowchart of a method for partitioning a schema object, according to an embodiment of the present invention.

FIG. 3 is a flowchart of a method for partitioning a database table or other schema object, according to an embodiment of the present invention. As shown, step S1 calls for the creation of schema objects (such as, for example, tables) within schema 106, if appropriate schema objects do not already exist within schema 106. Step S2 calls for the generation of a first list of unique dates (i.e., no repeated entries) of the entries of the loaded log file. These dates may be extracted from the "Time" field of the exemplary log file shown in FIG. 2, for example. From this first list, a second list of unique dates may be generated, as suggested at S3. The second list is a list of unique dates (i.e., the list does not contain duplicate dates), each of which precedes one of the unique dates in the first list. For example, if the first list includes the set of dates $\{D\}$=March 15, March 18, March 19, March 20, the second list will include the set of dates $\{D\text{-}1\}$=March 14, March 17, March 18, March 19. Collectively, therefore, the first and second lists collectively include the set of unique dates consisting of March 14, March 15, March 17, March 18, March 19 and March 20. According to embodiments of the present invention, these dates are then checked against existing partitions to determine which of these dates (if any) is not already associated with an existing partition, as shown in step S4. If, for example, partitions already exist for the dates of March 19 and March 20, the set $\{P\}$ of partitions to be created may include March 14, March 15, March 17 and March 18. Alternatively, the list of existing partitions may be obtained from, for example, a data dictionary (a set of metadata that describes the objects present in a database). The set of existing partitions may be denominated as $\{E\}$. As shown in Step S5, a third list may be created from the first and second lists and the set of existing partitions $\{E\}$ to determine $\{P\}$, the set of partitions to be created. To determine $\{P\}$, the set expression such as $[\{D\} \cup \{D\text{-}1\}]-\{E\}$ may be evaluated. That is, the list of partitions to be created includes partitions associated with each date within $\{D\}$ and $\{D\text{-}1\}$ that does not already exist in the set of existing partitions $\{E\}$.

Thereafter, for each date (P) in set $\{P\}$, steps S6 and S7 may be iteratively carried out. That is, the existing partition associated with the earliest date that is greater (later) than P is identified, as shown at S6. This identified partition is split at the boundary of the current date P in the set $\{P\}$ as shown at S7, thereby creating a new partition associated with the date P at which the existing partition was split. According to embodiments of the present invention, each partition in step S7 may be created by formulating and executing a DDL SQL (for example) statement with appropriate parameters such as, for example, an identification of which tablespace to assign to each partition.

As shown in step S8, the log file data from Web log file 104 may then be loaded into the partition(s) created within the schema object stored in the schema 106. According to one embodiment, all necessary partitions for all P in $\{P\}$ may be created before loading the log file data therein. Alternatively, the log file data may be loaded into the partitions as they are created, with the constraint that, before any data is loaded into a given partition, the partition for the date that immediately precedes the given partition is or has been created. This avoids the need to split a partition that contains data. Log file data may not be available for each created partition. Other ways of loading the log file data into the partitions of the schema object(s) may also be envisaged, as those of skill in this art may appreciate.

Figure 4:
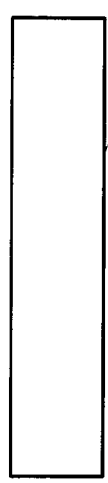
FIG. 4 shows aspects of an example of the method for partitioning a database table, according to an embodiment of the present invention.

FIGS. 4–7 shows aspects of an example of the method for partitioning a database table, according to an embodiment of the present invention. FIG. 4 shows a representation of a table at 402. In FIG. 4, the table 402 is partitioned, but contains only an initial partition. In range partitioning, the data for each entry (row of table) is loaded into the partition associated with the earliest date into which it will fit. For example, if data for March 9 is to be loaded into a partition, and the schema object already has partitions for March 10 and March 15, the data for March 9 will be loaded into a partition created by splitting the March 10 partition, and not into a partition created by splitting the March 15 partition. As shown in FIG. 4, the log file data includes entries for March 14 and 15, which dates make up set {D}. The set {D-1}, therefore, includes March 13 and March 14. {D} U {D-1 }, or the set {P} of partitions to be created, then includes March 13,March 14, March 15. MAXVALUE is a special token that represents infinity. Any records associated with a date less than the MAXVALUE token will be loaded into a partition created below the MAXVALUE token.

Figure 5:
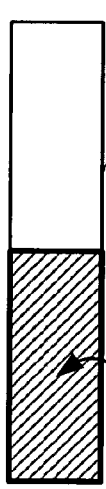
FIG. 5 shows further aspects of the example of FIG. 4.
Figure 6:
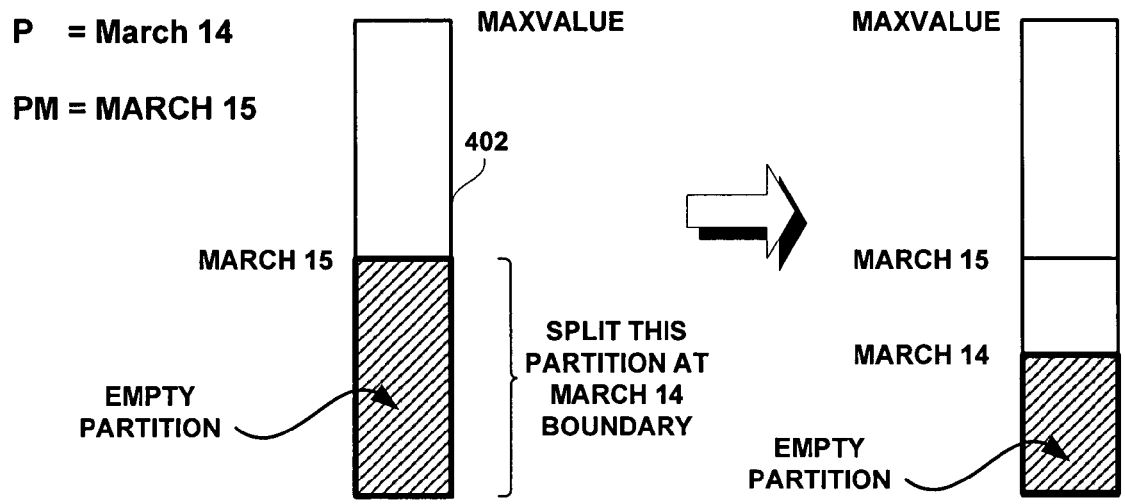
FIG. 6 shows still further aspects of the example of FIG. 4.

As shown in FIG. 5, for each P in {P}, a partition is created (if it does not already exist) such that P is less than $P_{max}$. As shown in FIG. 4, the current $P_{max}$ is MAXVALUE and no other partitions exists. Therefore, a new partition P is created such that P<$P_{max}$. Starting with P=March 15 and $P_{max}$=MAXVALUE, a partition P is created at March 15, which is the situation illustrated in FIG. 5. In this configuration, log file entries associated with dates that are greater than March 15 will be loaded into partitions created between the March 15 and MAXVALUE boundaries and log file entries associated with dates that are less (earlier) than March 15 will be loaded into partitions created after the March 15 boundary. As shown, the partition at the March 15 boundary is an empty partition, which may easily be split to create additional partitions. Turning now to FIG. 6, the next P in {P} is March 14 and the $P_{max}$ is March 15. That is, the March 15 partition is the next latest partition into which March 14 data should be loaded. Log file data associated with March 14 would not be loaded in the partition defined between MAXVALUE and March 15, as this partition is reserved for log file data associated with dates later than March 15. Therefore, with P=March 14 and $P_{max}$=March 15, a new partition is created at the March 14 boundary by splitting the March 15 empty partition, as shown in the left hand side of FIG. 6. As shown in the right hand side of FIG. 6, the table now has three partitions: an empty partition for log file data associated with dates earlier than March 14, one for March 15 log file data and another partition for log file data associated with dates later than March 15.

Figure 7:
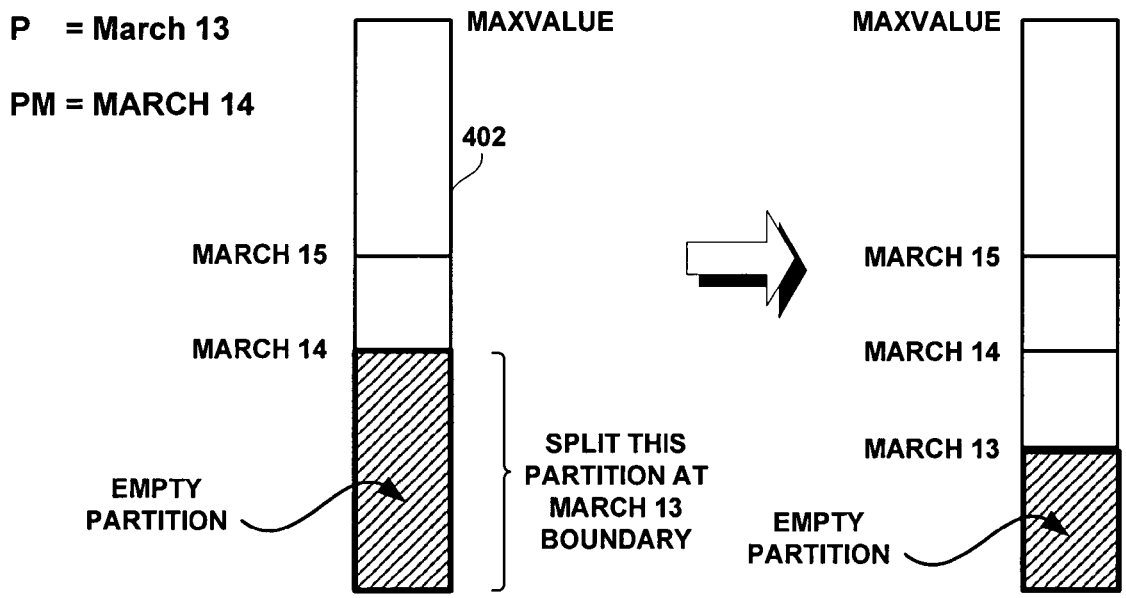
FIG. 7 shows further aspects of the example of FIG. 4.

As shown in FIG. 7, the next P of {P} is March 13 and the $P_{max}$ is March 14, as the March 14 partition is the latest partition into which log file data associated with the March 13 date may fit. As the March 14 partition is empty, it is easily split to create a new partition at the March 13 boundary. The log file data may be loaded into the appropriate partitions in table 402 after all partitions are created (one partition for each P of {P}), or the log file data associated with the date for which a partition was just created may be loaded into the just created partition before the other partitions for the remaining P of {P} are created with the constraint that, before any data is loaded into a given partition, the partition for the date that immediately precedes the given partition is or has been created, thereby avoiding the need to split a partition that contains data. Therefore, if the procedure detailed above is followed, it should not be necessary to split an existing partition that already contains log file data, as a partition is created for all {D-1 } that does not already exist in {E}, the set of existing partitions. In the example developed in FIGS. 4–7, a partition was created for March 13, even through the log files 104 did not contain any data associated with the March 13 date. The creation of a partition for March 13 log file data is carried out, according to an embodiment of the present invention, to ensure that an empty partition is created to enable further partitions to be created without splitting a partition that already has data stored therein. In this manner, if log file data is loaded out of turn, it will not be necessary to split a partition in which log file data has already been loaded. For example, consider the case wherein partitions for March 23, 24 and 25 are created and log file data corresponding to those dates are loaded into these partitions. Thereafter, if log file data corresponding to March 22 must be loaded into the table, if an empty March 22 partition has not previously been created, it will be necessary to split the March 23 partition, which partition already contains the March 23 log file data therein. It is significantly more expensive in terms of system resources to split an existing and non-empty partition than it is to split an existing empty partition. According to embodiments of the present invention, however, at the time of creating the partition for March 23 (D), another partition for March 22 (D-1) would also have been created, thereby ensuring that a partition exists for any March 22 or earlier data that may need to be loaded into the table 402.

Of course, embodiments of the present invention are not limited to the case wherein log file data associated with each date is loaded into a separate partition. Partitions may alternatively be created for a predefined range of dates (e.g., 2 days, a week, etc.) Moreover, embodiments of the present invention are not limited to log file data, but may advantageously be employed with other kinds of frequently updated data files. In addition, although the range partitioning utilized herein is based upon dates, other parameters may be used instead of dates to create partitions, without departing from the spirit and scope of the present invention.

Hardware Overview

Figure 8:
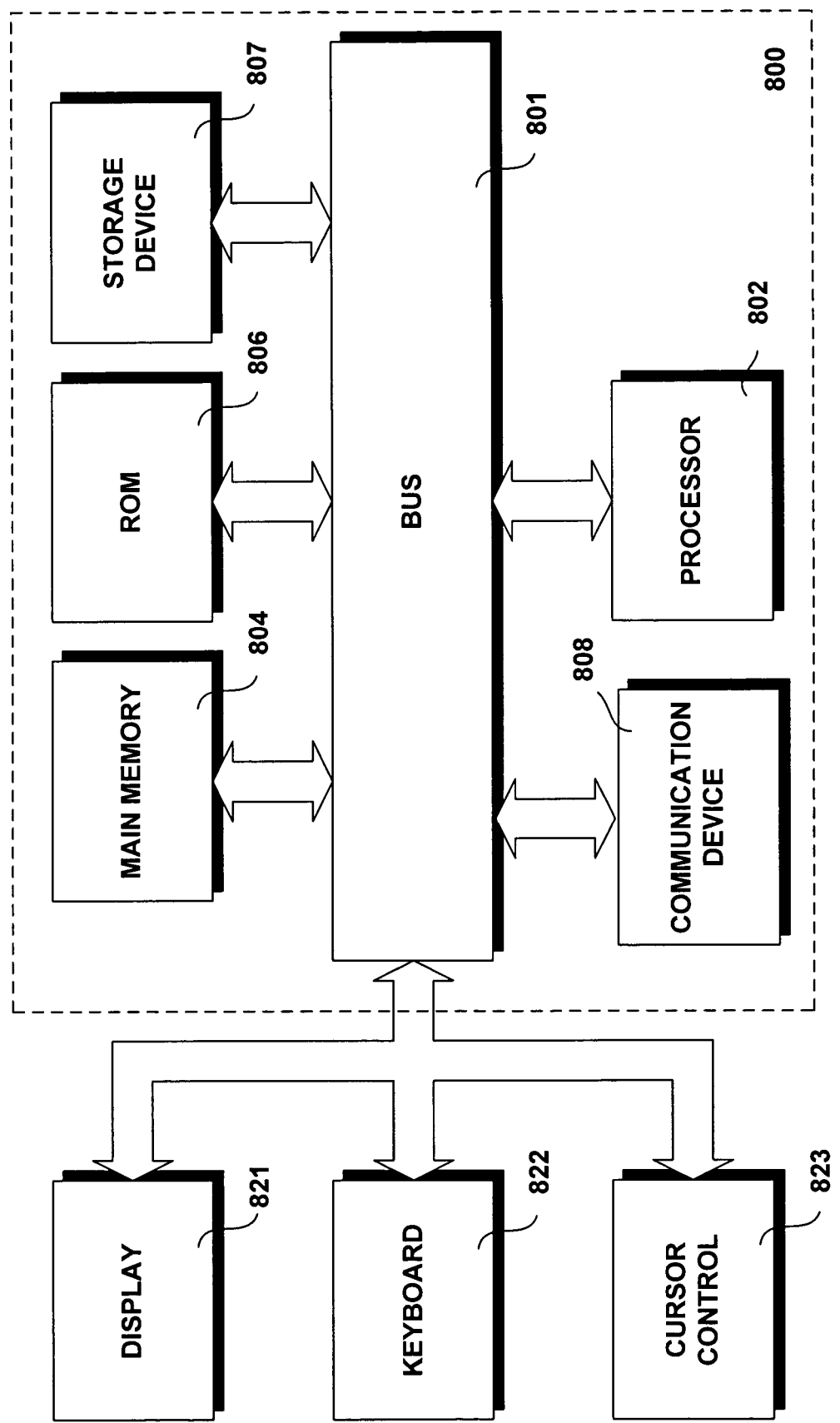
FIG. 8 illustrates a block diagram of a computer system within which the embodiments of the present invention may be implemented.

FIG. 8 illustrates a block diagram of a computer system 800 upon which an embodiment of the present invention may be implemented. Computer system 800 includes a bus 801 or other communication mechanism for communicating information, and one or more processors 402 (one shown in FIG. 8) coupled with bus 801 for processing information. Computer system 800 further comprises a random access memory (RAM) or other dynamic storage device 804 (referred to as main memory), coupled to bus 801 for storing information and instructions to be executed by processor(s) 802. Main memory 804 also may be used for storing temporary variables or other intermediate information during execution of instructions by processor 802. Computer system 800 also includes a read only memory (ROM) and/or other static storage device 806 coupled to bus 801 for storing static information and instructions for processor 802. A data storage device 807, such as a magnetic disk or optical disk, is coupled to bus 801 for storing information and instructions.

The computer system 800 may also be coupled via the bus 801 to a display device 821, such as a cathode ray tube (CRT), for displaying information to a computer user. An alphanumeric input device 822, including alphanumeric and other keys, is typically coupled to bus 801 for communicating information and command selections to processor(s) 802. Another type of user input device is cursor control 823, such as a mouse, a trackball, or cursor direction keys for communicating direction information and command selections to processor 802 and for controlling cursor movement on display 821. This input device typically has two degrees of freedom in two axes, a first axis (e.g., x) and a second axis (e.g., y), which allows the device to specify positions in a plane.

The present invention is related to the use of computer system 800 and/or to a plurality of such computer systems to automatically partition schema objects such as database tables. According to one embodiment, the partitioning is provided by one or more computer systems 800 in response to processor(s) 802 executing sequences of instructions contained in memory 804. Such instructions may be read into memory 804 from another computer-readable medium, such as data storage device 807. Execution of the sequences of instructions contained in memory 804 causes processor(s) 802 to perform the process steps that will be described hereafter. In alternative embodiments, hard-wired circuitry may be used in place of or in combination with software instructions to implement the present invention. Thus, the present invention is not limited to any specific combination of hardware circuitry and software.

While the foregoing detailed description has described preferred embodiments of the present invention, it is to be understood that the above description is illustrative only and not limiting of the disclosed invention. Thus, the present invention should be limited only by the claims as set forth below.

What is claimed is:

1. A method of partitioning a schema object comprising a plurality of rows, each row including a date, comprising the steps of:
   generating a list of dates associated with the plurality of rows;
   determining whether a partition exists for each unique date in the generated list of dates;
   determining whether a partition exists for each date that immediately precedes each unique date in the generated list of dates;
   carrying out a first creating step to create a partition for each date in the generated list of dates for which a partition does not yet exist, and
   carrying out a second creating step to create a partition for each date that immediately precedes each date in the generated list for which a partition does not yet exist.

2. The method of claim 1, wherein for each date in the generated list, the second partition-creating step is carried out before any data is stored in the partition created in the first partition-creating step.

3. The method of claim 2, wherein the second partition-creating step is carried out before any data is stored in the partition created in the second partition-creating step.

4. The method of claim 1, wherein the first and second partition creating steps are created with selectable parameters.

5. The method of claim 4, wherein the selectable parameters includes a tablespace to which the created partition is to belong.

6. The method of claim 1, wherein the generating step includes a step of reading a Web server log file.

7. The method of claim 1, wherein the first and second creating steps include formulating and executing a partition-creating command.

8. The method of claim 7, wherein the partition-creating command includes a Data Definition Language (DDL) Structured Query Language (SQL) command.

9. A machine-readable medium having data stored thereon representing sequences of instructions which, when executed by computing device, causes said computing device to partition a schema object comprising a plurality of rows, each row including a date, by performing the steps of:
   generating a list of dates associated with the plurality of rows;
   determining whether a partition exists for each unique date in the generated list of dates;
   determining whether a partition exists for each date that immediately precedes each unique date in the generated list of dates;
   carrying out a first creating step to create a partition for each date in the generated list of dates for which a partition does not yet exist, and
   carrying out a second creating step to create a partition for each date that immediately precedes each date in the generated list for which a partition does not yet exist.

10. The medium of claim 9, wherein for each date in the generated list, the second partition-creating step is carried out before any data is stored in the partition created in the first partition-creating step.

11. The medium of claim 10, wherein the second partition-creating step is carried out before any data is stored in the partition created in the second partition-creating step.

12. The medium of claim 9, wherein the first and second partition creating steps are created with selectable parameters.

13. The medium of claim 12, wherein the selectable parameters includes a tablespace to which the created partition is to belong.

14. The method of claim 9, wherein the generating step includes a step of reading a Web server log file.

15. The medium of claim 9, wherein the first and second creating steps include formulating and executing a partition-creating command.

16. The medium of claim 14, wherein the partition-creating command includes a Data Definition Language (DDL) Structured Query Language (SQL) command.

17. A computer system suitable for partitioning a schema object comprising a plurality of rows, each row including a date, comprising:
   at least one processor;
   at least one data storage device;
   a plurality of processes spawned by said at least one processor, the processes including processing logic for:
   generating a list of dates associated with the plurality of rows;
   determining whether a partition exists for each unique date in the generated list of dates;
   determining whether a partition exists for each date that immediately precedes each unique date in the generated list of dates;
   carrying out a first creating step to create a partition for each date in the generated list of dates for which a partition does not yet exist, and
   carrying out a second creating step to create a partition for each date that immediately precedes each date in the generated list for which a partition does not yet exist.

18. A method of partitioning a database table comprising a plurality of rows, each row being associated with a date, comprising the steps of:
   generating a first list of dates, the first list of dates containing dates associated with the plurality of rows;

generating a second list of dates from the first list, the second list containing only dates that immediately precede each date in the first list;

generating a third list of dates from the first and second lists of dates, the third list containing each unique date that appears on the first list or on the second list and that does not have an existing partition within the database table associated therewith;

for each date in the third list, sequentially carrying out the steps of:
    identifying a partition in the table associated with an earliest date that is after the date in the third list, and
    splitting the identified partition at a boundary defined by the date in the third list to create a new partition associated with the date in the third list.

19. The method of claim 18, wherein the first list generating step includes a step of reading a Web server log file, wherein the first list of dates is generated from data in the log file.

20. The method of claim 18, further including loading Web server log file data into at least one of the created new partitions.

21. The method of claim 19, wherein the splitting step creates a new partition for which the Web server log file has no Web server log file data.

22. A machine-readable medium having data stored thereon representing sequences of instructions which, when executed by computing device, causes said computing device to partition a database table comprising a plurality of rows, each row being associated with a date, by performing the steps of:

generating a first list of dates, the first list of dates containing dates associated with the plurality of rows;

generating a second list of dates from the first list, the second list containing only dates that immediately precede each date in the first list;

generating a third list of dates from the first and second lists of dates, the third list containing each unique date that appears on the first list or on the second list and that does not have an existing partition within the database table associated therewith;

for each date in the third list, sequentially carrying out the steps of:
    identifying a partition in the table associated with an earliest date that is after the date in the third list, and
    splitting the identified partition at a boundary defined by the date in the third list to create a new partition associated with the date in the third list.

23. The medium of claim 22, wherein the first list generating step includes a step of reading a Web server log file, wherein the first list of dates is generated from data in the log file.

24. The medium of claim 22, further including loading Web server log file data into at least one of the created new partitions.

25. The medium of claim 23, wherein the splitting step creates a new partition for which the Web server log file has no Web server log file data.

26. A computer system suitable for partitioning a database table comprising a plurality of rows, each row being associated with a date, the computer system comprising:

at least one processor;

at least one data storage device;

a plurality of processes spawned by said at least one processor, the processes including processing logic for:

generating a first list of dates, the first list of dates containing dates associated with the plurality of rows;

generating a second list of dates from the first list, the second list containing only dates that immediately precede each date in the first list;

generating a third list of dates from the first and second lists of dates, the third list containing each unique date that appears on the first list or on the second list and that does not have an existing partition within the database table associated therewith;

for each date in the third list, sequentially carrying out the steps of:
    identifying a partition in the table associated with an earliest date that is after the date in the third list, and
    splitting the identified partition at a boundary defined by the date in the third list to create a new partition associated with the date in the third list.

27. A method of partitioning a schema object containing Web server log file data, the log file data including a plurality of dated entries, comprising:

identifying existing partitions within the schema object, a date being associated with each existing partition;

identifying unique dates of the entries within the log file data;

creating a separate partition within the schema object for:
    a) each identified unique date of the entries within the log file data that is not associated with an identified existing partition, and
    b) each date immediately preceding each date in a) unless previously created.

* * * * *